Feb. 15, 1927.
G. W. CISCO
1,617,897
TEMPERATURE INDICATOR
Original Filed June 22, 1920
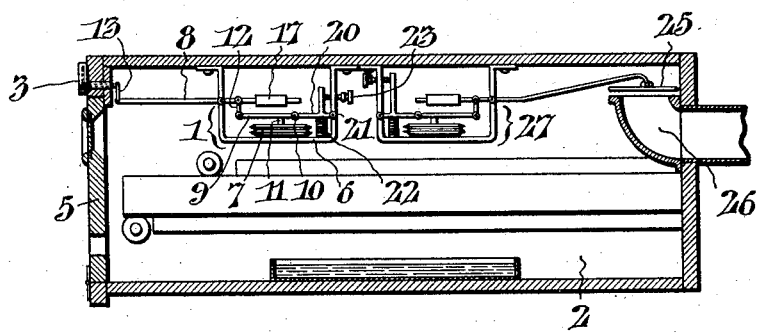
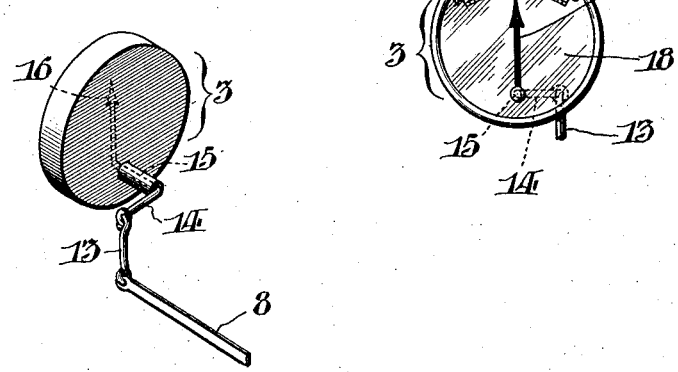
WITNESSES:
John C. Bergner
James H. Bell
INVENTOR:
George W. Cisco,
BY
ATTORNEYS.

Patented Feb. 15, 1927.

1,617,897

UNITED STATES PATENT OFFICE.

GEORGE W. CISCO, OF HAWTHORNE, NEW JERSEY.

TEMPERATURE INDICATOR.

Application filed June 22, 1920, Serial No. 390,725. Renewed July 8, 1925.

The invention relates to temperature indicators useful in connection with incubators and the like.

Heretofore, it has been the custom to employ ordinary thermometers for ascertaining the temperature within incubators. These were placed on the egg trays, and invariably in such positions that they could not be read without opening the door of the incubator compartment, and consequently exposing the eggs to the chilling influence of outside air.

The object of the present invention is to obviate this difficulty by making it possible to ascertain the temperature conditions within the incubator compartment without the necessity of access to the interior, and to this end, I have devised a direct reading dial indicator adapted to be located at a convenient point upon the outside of the incubator structure and arranged to be automatically operated by a thermostatically controlled actuating mechanism disposed within the compartment.

Referring to the drawings, Fig. I is a cross sectional view through a compartment of the incubator structure conveniently showing my invention applied thereto.

Fig. II is a face view of the dial indicator graduated for direct temperature reading; and Fig. III is a perspective view showing the manner in which the pointer of the dial indicator is connected to the actuating arm of the thermostatically controlled mechanism within the incubator compartment.

From Fig. I, it will be observed that the device comprises a thermostatically controlled actuating mechanism which is comprehensively indicated at 1, disposed within the incubator compartment 2, and a dial indicator 3 located at the front of the indicator structure, preferably above the hinged door designated at 5. To the fixed supporting bracket 6 of the mechanism 1 is secured a wafer or disk thermostat 7 which is operative upon an actuating arm 8 through a multiplying leverage system which is about to be described. This system includes a lever 9 operatively interposed between the indicator 3 and the thermostat 7 pivoted and fulcrumed at one end as indicated at 10, and adapted to be engaged from beneath at a point adjacent its pivot by the axial stud 11 of the thermostat 7. At its opposite end, the lever 9 is coupled, by means of a link connection 12, with the actuating arm 8. By proportioning the various moving elements of the mechanism as shown, it will be readily seen the motion of the actuating arm 8 is considerably magnified.

The outer end of the arm 8 is operatively connected, through the instrumentality of a link 13, to the integral crank 14 of the shaft 15, to which the pointer 16 of the dial indicator 3 is attached, see Fig. III. In order that the arm 8 may be rendered more sensitive to induced movement, it is counterbalanced by a weight 17 adjustably set upon its inner end.

The dial 18 of the indicator 3 is graduated for cooperation with the pointer 16, the scope of the scale being preferably confined within a few degrees of the temperature which should be normally maintained for proper incubation, as suggested in Fig. II. By this arrangement, it will be apparent that the temperature conditions within the incubator compartment may be readily ascertained by inspection of the dial indicator and without the necessity of opening the door 5 of the compartment.

In order that the movement induced in the actuating arm 8 may be varied and regulated so as to give proper coordination of the pointer 16 of the indicator 3, with the graduations of the dial 18, I have provided for the adjustment of the pivot 10 of the lever 9 vertically with respect to the thermostat 7. To this end, the pivot of said lever is carried by a fulcrum support in the form of a bell crank 20, capable of being swung about a fixed centre or fulcrum 21. The horizontal arm of the bell crank 20 is pressed upward by a coiled spring 22, in opposition to an adjustable stop screw 23, adapted to engage its vertical arm. Thus by proper manipulation of the screw 23, the fulcrum of the lever 9 may be so shifted as to vary the range of movement of the pointer 16 by shifting such range bodily (so to speak) relatively to the scale on the dial 18.

The damper 25 of the hot air inlet 26 for the incubator compartment may be governed by a thermostatically controlled mechanism 27, similar to the one already described.

Having thus described my invention, I claim:

1. A device of the character described comprising an actuating mechanism for disposal within an incubator compartment, including an actuating arm, a thermostat, motion multiplying means interposed between said arm and said thermostat, and means for adjusting said multiplying means to vary the range of motion of the arm induced thereby; in combination with a dial indicator for location upon the exterior of the incubator structure having a dial graduated for direct temperature reading and a pointer operatively connected to said actuating arm cooperating with said dial.

2. A device of the character dsecribed comprising an actuating mechanism for disposal within an incubator compartment, including an actuating arm, a thermostat, a motion multiplying lever interposed between said arm and the thermostat, and means providing a fulcrum for said lever and adjustable with respect to the thermostat to vary the range of motion of the arm induced by the thermostat; in combination with a dial indicator for location upon the exterior of the incubator structure having a dial graduated for direct temperature reading, and a pointer operatively connected to said actuating arm cooperating with said dial.

3. A device of the character described comprising a dial indicator for location upon the exterior of an incubator structure having a dial graduated for direct temperature reading and a pointer cooperating with said dial; in combination with actuating mechanism for disposal within an incubator compartment including a thermostat, motion multiplying means operatively connecting said thermostat with the pointer of said indicator, and means for adjusting the motion multiplying means to shift the range of movement of the arm induced thereby.

4. A device of the character described comprising an actuating mechanism for disposal within an incubator compartment, including a fixed supporting bracket, an actuating arm fulcrumed on said bracket, a thermostat on said bracket, a motion multiplying lever connected to said arm and actuated by said thermostat, and a pivot for said multiplying lever with means for adjusting the same about a fulcrum on said supporting bracket to vary the range of motion of said arm induced by the thermostat; in combination with a dial indicator having a dial at the exterior of the incubator structure and a pointer operatively connected to said actuating arm cooperating with said dial.

In testimony whereof, I have hereunto signed my name at Hawthorne, New Jersey, this 14th day of June, 1920.

GEO. W. CISCO.